C. SCHMELE.
GATE FASTENER.
APPLICATION FILED SEPT. 14, 1920.
1,397,459.
Patented Nov. 15, 1921.
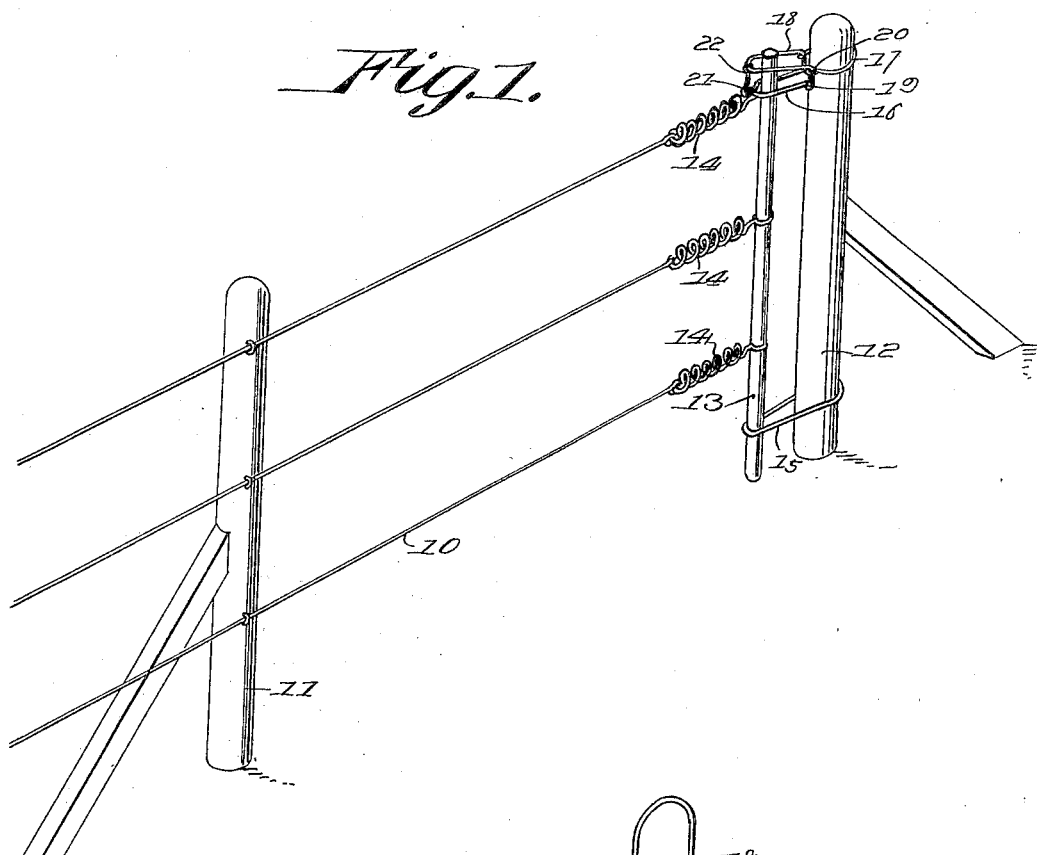
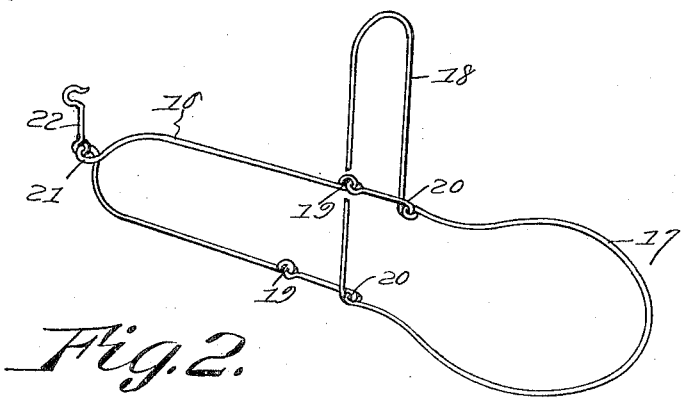
Inventor
Carl Schmele,
By G. Hume Talbert
Attorney

UNITED STATES PATENT OFFICE.

CARL SCHMELE, OF NEWELL, SOUTH DAKOTA.

GATE-FASTENER.

1,397,459. Specification of Letters Patent. Patented Nov. 15, 1921.

Application filed September 14, 1920. Serial No. 410,108.

*To all whom it may concern:*

Be it known that I, CARL SCHMELE, a citizen of the United States of America, residing at Newell, in the county of Butte and State of South Dakota, have invented new and useful Improvements in Gate-Fasteners, of which the following is a specification.

The object of the invention is to provide a simple and inexpensive means for securing a gate stick in its closed or operative position and which is designed for use when the gate opening is fitted with a gate seat of an extension of the line wires of the fence, as for example when formed for separate swinging or sliding movement and it is incidentally the object of the invention to provide a gate stick holding means which will operate to maintain a proper tension in the line wire to constitute the filler in the gate opening; and with these objects in view, the invention consists in a construction and combination of parts, of which a preferred embodiment is shown in the accompanying drawing, wherein:—

Figure 1, is a view of a gate structure embodying the gate stick and fastening means for the same constructed in accordance with the invention.

Fig. 2, is a detail view of the gate stick and fastener.

In the construction illustrated the line wire extensions 10 which are designed to span the gate opening represented by the interval between the line post 11 and the gate post 12 are connected with the gate stick 13 through the interposed spring coils 14 so that as the gate stick is drawn toward the gate post, the wire extensions will be placed in a tension sufficient to properly perform their function of affording a barrier to prevent stock from passing through the gate opening. The gate stick is adapted to be engaged at its lower end with the stop 15 consisting of a loop carried by the lower portion of the gate post and at its upper end the gate stick is engaged by the fastener consisting of two loops 16 and 17 adapted respectively for engagement with the upper end of the gate stick and the gate post engaged by the operating member 18 also preferably of looped form with the extremities of its sides jointed as at 19 to the ends of the stock loop 16 and extending through guide eyes 20 on the extremities of the gate post loop 17. The legs of the loop 18 are bent at the point of extension through the guide eyes 20, so that those portions connecting with the loop 16 are disposed at right angles with the remainder of the loop 18. When the loop 18 is at right angles to the loop 17, the loops 16 and 17 are the greatest distance apart, the loop 16 being drawn toward the loop 17 upon movement of the operating member 18 in the direction of the loop 16. In adjusting the fastener to secure the stick in its proper position to engage the loops 16 and 17 respectively with the gate stock and gate post the operating element 18 is drawn forward and downward to the position indicated in Fig. 1 so as to pass over the upper end of the gate stick and thus draw the gate stick and gate post loop toward each other and hence the upper end of the gate stick toward the gate post. Connected with the eye 21 on th gate stick member 16 is a hook 22 for engagement with the looped end of the operating element 18 to hold the latter in its adjusted position.

Obviously to release the gate stick so as to provide for exposing the gate opening to permit the passage therethrough it is only necessary to adjust the hook 22 over the loop 18 and thus permit the swinging movement of the latter to release the tension on the loops 16 and 17 whereupon the former may be re-fitted over the upper end of the gate stick when the lower end of the latter may be withdrawn from the keeper of said loop 15. The fastener is retained in position on the gate post by reason of the engagement of the loop 17 therewith.

The invention having been described, what is claimed as new and useful is:—

1. A gate stick and fastener embodying oppositely extending loops for respective engagement with a gate stick and a gate post, and a looped operating element having the extremities of its legs loosely connected with the extremity of one of said loops and extending through eyes on the extremities of the other loop, those portions of the operating element connecting the two loops being disposed at right angles to said operating element for the purpose specified.

2. A gate stick and fastener embodying oppositely extending loops for respective engagement with a gate stick and a gate post, a looped operating element having the extremities of its legs loosely connected with the extremity of one of said loops and extending through eyes on the extremities of the other loop, those portions of the operating element connecting the two loops being disposed at right angles to said operating element, and means for securing said operating element in substantial parallelism with one of said loops.

In testimony whereof he affixes his signature.

CARL SCHMELE.